United States Patent [19]

Okuda et al.

[11] 4,090,796
[45] May 23, 1978

[54] DEVICE FOR FASTENING NEEDLE CASE TO YOKE IN UNIVERSAL JOINT OF TRUNNION TYPE

[75] Inventors: Hiroji Okuda; Shigenori Harada, both of Nara, Japan

[73] Assignee: Koyo Seiko Company, Limited, Osaka, Japan

[21] Appl. No.: 819,217

[22] Filed: Jul. 25, 1977

[51] Int. Cl.² ............................................... F16D 3/26
[52] U.S. Cl. ...................................... 403/24; 403/381; 403/318; 64/17 R
[58] Field of Search ............... 403/381, 331, 316, 319, 403/318, 24; 64/17 R, 17 A, 17 SP

[56] References Cited

U.S. PATENT DOCUMENTS

| 732,389 | 6/1903 | Wheater | 403/381 X |
|---|---|---|---|
| 1,336,985 | 4/1920 | Thiemer | 64/17 R |
| 1,455,640 | 5/1923 | McNamara | 403/381 X |
| 1,807,646 | 6/1931 | Wright | 403/331 |
| 2,255,604 | 9/1941 | Warner | 64/17 A |
| 2,698,527 | 1/1955 | Anderson | 64/17 A |
| 2,996,158 | 8/1961 | Greenleaf | 403/370 |
| 3,216,087 | 11/1965 | Harrington | 64/17 A |
| 3,253,842 | 5/1966 | Rabe | 403/381 |

FOREIGN PATENT DOCUMENTS

| 1,332,113 | 6/1963 | France | 403/381 |
|---|---|---|---|
| 140,233 | 3/1953 | Sweden | 403/381 |
| 123,028 | 11/1927 | Switzerland | 403/381 |

Primary Examiner—Andrew V. Kundrat
Attorney, Agent, or Firm—Mason, Fenwick & Lawrence

[57] ABSTRACT

A needle case and a yoke are respectively formed on their surfaces to be joined together with a key and a keyway which are so shaped as to provide a clearance for receiving a wedge of suitable shape. When driven into the clearance thus provided in the keyway between the needle case and the yoke fastened together, the wedge tightly holds them together in intimate contact with each other.

4 Claims, 6 Drawing Figures

DEVICE FOR FASTENING NEEDLE CASE TO YOKE IN UNIVERSAL JOINT OF TRUNNION TYPE

BACKGROUND OF THE INVENTION

The present invention relates to a device for fastening a needle case to a yoke for use in universal joints of the trunnion type, and more particularly to such a device useful in universal joints having a limited swing diameter.

With universal joints heretofore known in which the needle case is adapted to be fastened to the yoke by two bolts, a key of simple shape on the surface of the needle case to be joined to the yoke is merely engaged in a keyway of identical shape formed in the surface of the yoke to be joined to the needle case, and the needle case and the yoke are fastened together by the bolts.

During the transmission of torque, the needle case A shown in FIGS. 1 and 2 is subjected to a tilting torque which is the product of torque F of the universal joint multiplied by distance $h$ from the joint surface to the center of the trunnion, i.e., $F \times h$. The tilting torque, which acts to tilt the needle case A on the joint surface of the unillustrated yoke, is to be received not by the bolt B but by the joint of the key C and keyway (not shown). However, if there is a clearance between the key C and the grooved portion of the yoke, tension $P = Fh/(X + Y)$ will act on the fastening bolt B. Accordingly, the bolt must possess a fastening force sufficient to tightly hold the needle case to the yoke in intimate contact therewith during the transmission of torque against the tilting torque. Invariably, therefore, there is a tendency to use a bolt of large diameter.

It is noted that the universal joint shown in FIG. 1 has a limited swing diameter $D_0$ which in turn limits the maximum width L of the needle case A. If it is then attempted to increase the size of the bolt B without altering the torque capacity of the universal joint, the diameter $d$ of the bolt hole shown in FIG. 2 increases, consequently reducing the thicknesses $\delta$ and H on the joint surface of the portion of the needle case A defining the bolt hole. Thus there is the likelihood that the fastening force of the bolt B and the transmitted torque will deform the needle case A.

The reduction in the rigidity of the needle case will reduce the life of the universal joint and result in needle case fracture. Consequently, the combination of an increased bolt size and a sufficiently rigid needle case can be achieved only by decreasing the race diameter $D_1$ of the needle case A. This leads to a reduction in the diameter $D_2$ of the trunnion and a reduced torque capacity.

SUMMARY OF THE INVENTION

An object of this invention is to provide a fastening device which is especially useful in universal joints having a limited swing diameter and which is capable of fastening the needle case to the yoke with sufficient tightness while ensuring sufficient rigidity of the needle case without resorting solely to the fastening force afforded by the fastening bolts and further without increasing the bolt diameter.

Another object of this invention is to provide a fastening device useful in universal joints of limited swing diameter and permitting the joint to have a sufficiently large torque transmitting capacity.

Still another object of this invention is to enable a universal joint of given torque transmitting capacity to have the smallest possible swing diameter and therefore a compacted structure.

According to this invention, a needle case and a yoke are respectively formed on their surfaces to be joined with a key and a keyway which are so shaped as to provide a clearance for receiving a wedge of suitable shape when the needle case and the yoke are fastened together. The wedge, when driven into the clearance, tightly holds the needle case to the yoke.

The wedge thus forced into the clearance and effectively fastening the needle case to the yoke overcomes the disadvantage that the fastening force afford by the bolts along has heretofore been resorted to in withstanding the force $F \times h$ shown in FIG. 2, thus eliminating the necessity to use bolts of larger diameter.

Other objects and features of this invention will become more apparent from the following description.

DESCRIPTION OF THE PREFERRED EMBODIMENTS

Figure 1:
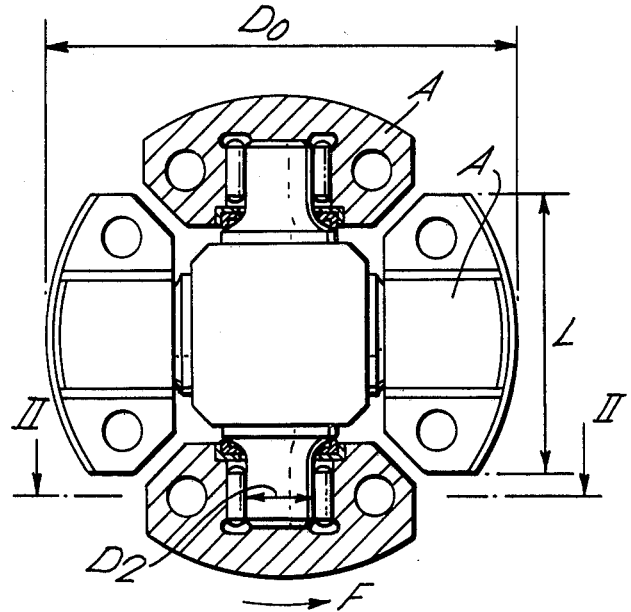
FIG. 1 is a view partly in vertical section showing the main part of a universal joint of the trunnion type.
Figure 2:
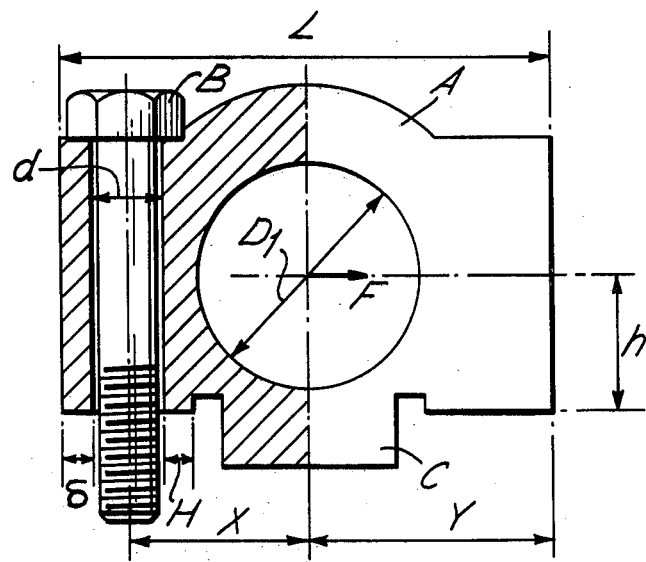
FIG. 2 is an enlarged view showing a conventional needle case partly in cross section taken along a line corresponding to the line II-II in FIG. 1.
Figure 3:
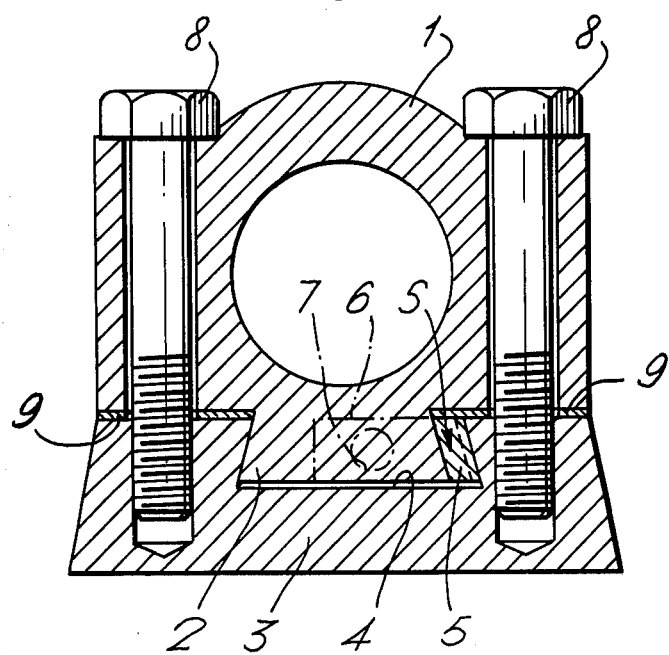
FIG. 3 is a view similar to FIG. 2 and showing an embodiment of this invention.
Figure 4:
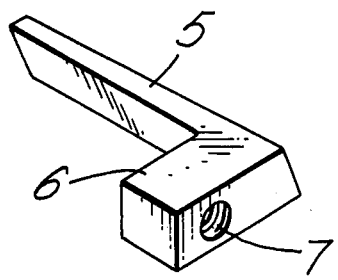
FIG. 4 is a perspective view of a wedge to be driven into a clearance provided in a keyway.

FIGS. 3 and 4 show an embodiment of this invention. A needle case 1 is formed with a key 2 on its surface to be joined to a yoke 3. As shown in FIG. 3, the key 2 has a trapezoidal cross section with an increased width at its lower end. The yoke 3 is formed, in its surface to be joined to the needle case 1, with a keyway 4 in the form of a dovetail groove conforming to the shape of the key 2. When the key 2 is fitted in the keyway 4, there is provided a clearance S defined by a side face of the key 2 and the inside surface of the yoke 3 defining the keyway 4 for receiving a wedge 5 of suitable shape as shown in FIG. 4. The wedge 5, when forced into the clearance S between the needle case 1 and the yoke 3 fastened together by bolts 8, tightly holds the case 1 to the yoke 3 in intimate contact with each other. The head 6 of the wedge 5 is formed with a threaded bore 7. The wedge 5 is readily removable from the clearance for the maintenance, inspection or replacement of the joint by outwardly pulling the wedge 5 by an unillustrated bolt in screwthread engagement with the bore 7. Indicated at 9 is a yoke pilot interposed between the needle case 1 and the yoke 3 for positioning the needle case 1 in place.

Figure 5:
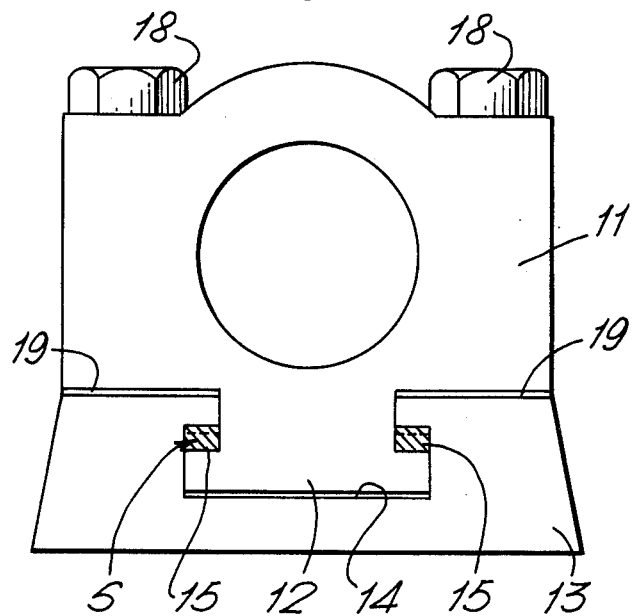
FIG. 5 is a view corresponding to FIG. 3 and showing another embodiment of this invention.
Figure 6:
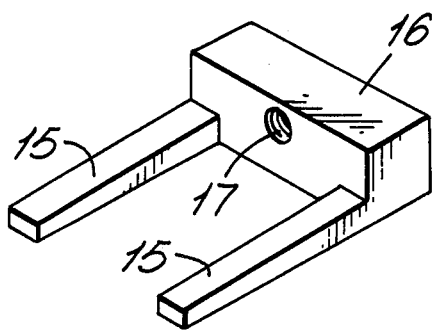
FIG. 6 is a perspective view of another wedge adapted for use in the embodiment of FIG. 5.

FIGS. 5 and 6 show another embodiment of this invention. The needle case 11 has a key 12 of T-shaped cross section, while a yoke 13 has a T-shaped keyway 14 conforming to the shape of the key 12. A suitable clearance S is formed between the inside surface of the T-shaped key 12 and the inside surface opposed thereto and defining the T-shaped keyway 14. The needle case 11 is first fastened to the yoke 13 by bolts 18 with the key 12 fitted in the keyway 14 and a wedge 15 is then forced into the clearance S. The wedge 15 tightly holds the needle case 11 to the yoke 13. Like the wedge 5, the wedge 15 has a threaded bore 17 in its head 16 for withdrawing the wedge 15.

According to this invention, the key, keyway and wedge are so shaped that the wedge will exert a fastening force on the needle case and the yoke to hold them together tightly in intimate contact with each other. As a result, the wedge driven into the clearance effectively holds the needle case and the yoke together with the key tightly held in the keyway.

What is claimed is:

1. A device for fastening a needle case to a yoke in a universal joint of the trunnion type comprising:
    a needle case provided with a key on its surface,
    a yoke having a surface to be joined to the needle case and a keyway being formed in said surface for receiving the key therein, the keyway providing a clearance between the inside surface of the yoke defining the keyway and the key when the key is engaged in the keyway,
    a wedge to be forced into said clearance for tightly holding the needle case to the yoke in intimate contact with each other, said wedge including a wedge body to be driven into the clearance and a wedge head projecting from the body,
    a means for removing the wedge provided at the head end of the wedge, and
    a plurality of bolts for fastening the needle case to the yoke.

2. A device as defined in claim 1 wherein the key is trapezoidal in cross section and the keyway is in the form of a dovetail groove conforming to the shape of the key, the clearance being defined by a side surface of the key and the opposed inside surface of the yoke defining the keyway.

3. A device as defined in claim 1 wherein the key is T-shaped in cross section and the keyway is a T-shaped groove conforming to the shape of the key, the clearance being defined by the inside surface of the key and the inside surface of the yoke defining the T-shaped groove.

4. A device as defined in claim 1 wherein the means for removing the wedge include a threaded bore extending through the head and a bolt threadably engageable with the threaded bore and extending therethrough.

* * * * *